INVENTOR:
Edgar Gretener,
BY Pierce, Scheffler & Parker,
ATTORNEYS.

April 3, 1956 E. GRETENER 2,740,829

PROJECTION-COLOR TELEVISION RECEIVER

Filed Sept. 4, 1951 5 Sheets-Sheet 2

INVENTOR:

Edgar Gretener,

BY Pierce, Scheffler & Parker,

ATTORNEYS.

PROJECTION-COLOR TELEVISION RECEIVER

Filed Sept. 4, 1951 5 Sheets-Sheet 3

INVENTOR:
Edgar Gretener,

BY Pierce, Scheffler + Parker,
ATTORNEYS.

April 3, 1956 E. GRETENER 2,740,829

PROJECTION-COLOR TELEVISION RECEIVER

Filed Sept. 4, 1951 5 Sheets-Sheet 4

INVENTOR
Edgar Gretener,

BY Pierce, Scheffler & Parker,
ATTORNEYS.

Edgar Gretener
INVENTOR.
BY
Pierce, Scheffler & Parker
Attorneys.

2,740,829

PROJECTION-COLOR TELEVISION RECEIVER

Edgar Gretener, Zurich, Switzerland

Application September 4, 1951, Serial No. 245,023
Claims priority, application Switzerland September 4, 1950
11 Claims. (Cl. 178—5.4)

The present invention is relative to an apparatus for projecting television pictures or the like, especially to an apparatus for the simultaneous projection of colour component pictures required for the production of a colour television picture.

In the U. S. patent of Friedrich E. Fischer, No. 2,391,-450, a method is described, which is capable of reproducing television pictures with high brilliancy by modulating the light flux of a separate light source, for example, an arc lamp, by means of a control medium acted upon by the television signal. The control medium may consist of a layer of viscous liquid or an elastic substance of high internal friction. An electron beam, in the habitual way, scans in adjacent parallel lines a rectangular area on the surface of the control layer which corresponds to the television picture to be projected. The electron beam itself is modulated by the incoming electric television signals in accordance with the contents of the picture, which results in a corresponding distribution of electric charges on the surface. The electrostatic forces varying from point to point and corresponding to this distribution of charges then cause a deformation of the surface. The control layer whose deformation serves to store the incoming television signals is located within a Schlieren optics and modulates the light from an outside source passing through the Schlieren optics. The light leaving the Schlieren optics is projected by a lens on the screen, thus producing the television picture.

It will be understood that it is by no means necessary to bring about the light control by a superficial deformation of the control medium, or to effect this deformation by electrostatic forces produced by an electron beam. Control media with other variable properties, such as e. g. control media with variable index of refraction, or other methods for effecting point-to-point variations of the control medium, such as e. g. any suitably modulated kind of electromagnetic (infrared, ultraviolet etc.) radiation may be employed. The essential point common to all such light control methods resides in the feature that point-to-point variations of the optically effective path length of the control layer are produced by means of radiation modulated in accordance with the contents of the picture to be projected, and that the light flux of the separate light source is controlled by such point-to-point variations through the intermediary of a Schlieren optics.

A method for large screen projection of television pictures according to the above mentioned Letters Patent has been described in the Journal of the Society of Motion Picture and Television Engineers, vol. 54, April 1950, pp. 393–406, by Labin and is designated there as the Eidophor method. Such a system has the advantage that every point of the screen is illuminated for the full length of a picture period in contradistinction to the usual methods of television projection using a cathode-ray tube with a moving light spot. In the latter case only a single point of the entire picture radiates light at any instant and the obtainable brilliancy of the screen will be limited by the brightness of the spot of the cathode beam, which as is well known cannot exceed a certain value. The Eidophor method in contradistinction thereto uses an independent light source whose light is modulated by the control layer and a projection light flux may be obtained which is of the order of magnitude of standard film projection.

For the purpose of colour television several methods have already been proposed which either provide simultaneous-projection of three coloured pictures, corresponding to the three colour components (simultaneous systems) or alternate projection in succession of these three component pictures (sequential systems). The latter method may also assume the characteristics of a colour raster method (dot or line sequential systems) in which as is well known the entire picture is composed by adjacent differently coloured points or lines, for example, blue, green and red corresponding to the coloured components which alternate along the lines and or along the columns, thus producing three interlacing colour component pictures. The latter sequential methods as compared to black and white method, produce a lower brilliancy of the picture since decomposition into successive or adjacent component pictures yields only one-third of the light flux obtainable in black and white television picture. Simultaneous projection of three colour component pictures will eliminate this drawback, but requires three separate complete projectors for the three colour components.

It is an object of the invention to utilize a projection system of the above identified type with one bar system and one concave mirror only for the simultaneous projection of the component pictures of colour television or the like.

According to the present invention, therefore, an apparatus for the simultaneous projection of the component colour pictures of a colour television picture or the like is employed comprising a light source with illumination system, a Schlieren optics with a mirror bar system, a concave mirror with a control layer spread over it and a projection lens, and at least one source of radiation scanning said control layer at several areas corresponding to said component pictures and thus imparting point-to-point variations to said layer in correspondence with the appertaining picture signals, said control layer thereby selectively controlling the light flux emitted by said light source. Such an apparatus is characterized by a colour splitter comprising at least two dichroic light filters having different spectral band reflection-transmission characteristics, said colour splitter being located between the mirror-bar system and the concave mirror and splitting up the white light into at least three light beams or tubes of different colour, and auxiliary deflection means between the bar system and the concave mirror deflecting said tubes of coloured light in such a manner that each of said tubes impinges upon one of the component picture areas and that from each of said areas a virtual image of the bar system is seen with its center approximately coinciding with the centre of curvature of said concave mirror and that as seen from the bar system, said picture areas coincide in registration, whereby one and the same mirror-bar system is utilised for all colour component pictures.

The embodiments of invention will now be explained with the help of the attached drawings. Reference will be made to the above mentioned "Eidophor" system, which employs a control layer the surface of which is deformed by a cathode ray. The invention is, however, not intended to be limited thereby to that particular system, as it may advantageously be employed also in other systems providing a control medium with other variable properties or other methods to bring about these variations.

For the sake of clarity such embodiments will first be described wherein the partial component pictures are located on a common concave mirror. The more general case of the present invention wherein the component pictures are located on separate concave mirrors will be described thereafter.

Figures 1, 2:
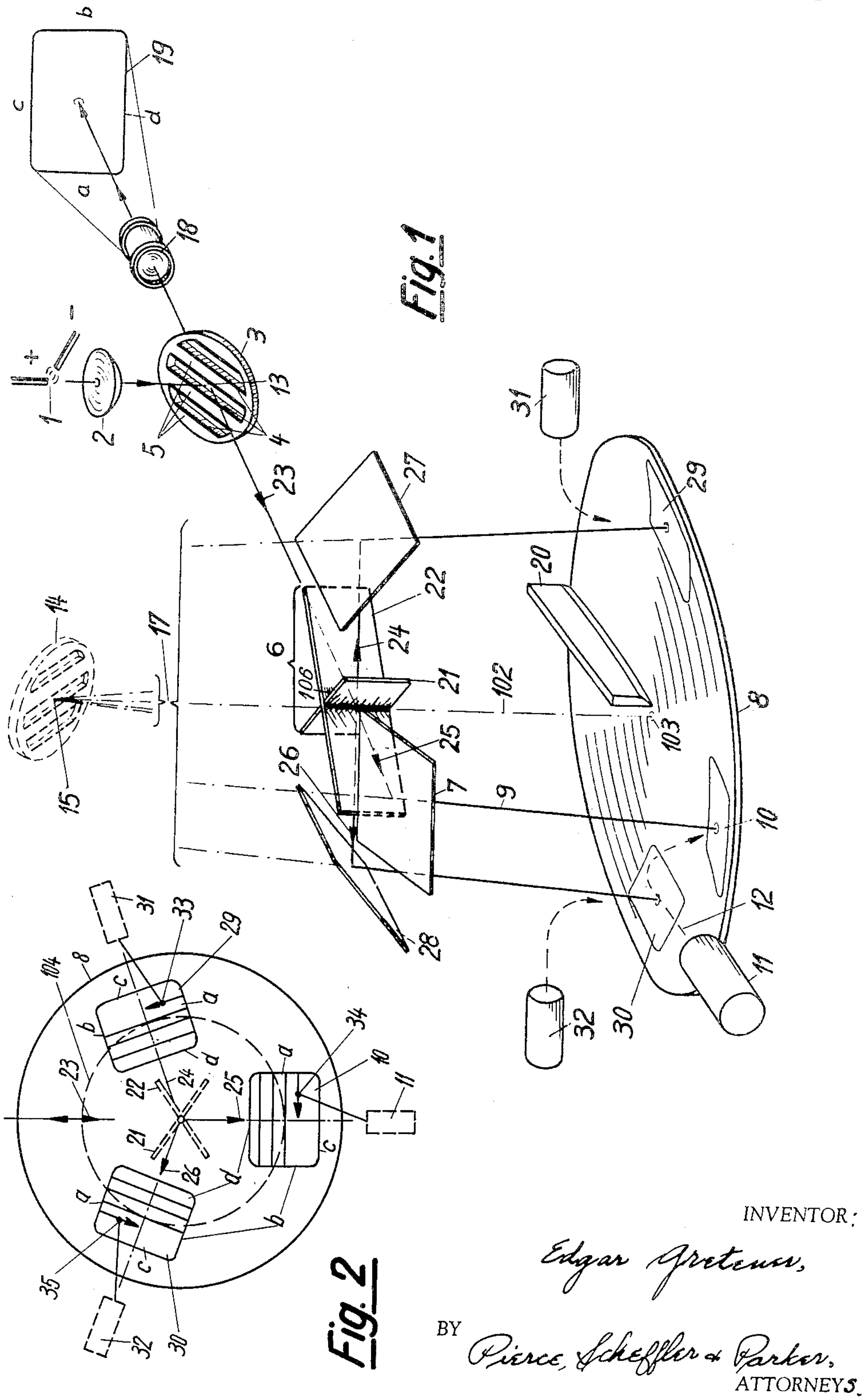
Fig. 1 shows in schematic perspective representation an embodiment of the present invention for projecting colour television pictures, using a set of intersecting dichroic mirrors as colour splitter.
Fig. 2 shows in top view the location of the areas of the colour component pictures on the surface of the concave mirror according to Fig. 1.

Fig. 1 shows in schematic perspective representation an embodiment, wherein a light source 1, for example, an arc lamp, illuminates through a condenser 2 a mirror bar system 3 of a Schlieren optics. The mirror bar system consists of bars 4 with reflecting surfaces 5. The light reflected by the reflecting surfaces 5 impinges upon the surface of a concave mirror 8 after passing through a colour splitter 6 and being deflected by a deflection mirror 7. In order to explain beforehand in brief the basic operation of the Schlieren optics, the effect of the colour splitter is disregarded at present, and only the light beam 9 will be considered. The surface of the concave mirror 8 is covered by a thin layer of a control medium, for example, of viscous liquid or elastic substance of a high internal friction. Different electric charges varying from point to point are deposited on the surface of the control medium inside a rectangular area 10 corresponding to the contours of television picture to be projected. The charges are deposited by the electron beam 12 produced by a cathode-ray tube 11 which scans the rectangular area 10 by employment of deflecting means well known to any one skilled in the art of television. The deflecting means as well as additional devices for deflecting the electron beam through 90° are omitted. Attention is invited to the fact, that a cathode-ray tube has been shown with its axis approximately parallel to the surface of the concave mirror for the purpose of simplifying the drawing. It is evidently equally possible to arrange the tube with its axis approximately at right angles to the surface of the concave mirror and such an arrangement would preferably be chosen for practical application on account of its reduced cost. The distribution of the electric charges on the rectangle 10 of the control layer must correspond to the contents of the picture and is obtained by modulating the electron beam by the received television signals. By ways of example, the intensity or velocity of deflection of the beam may be modulated as is explained in detail in the above-mentioned patent specification No. 2,391,450. The charges applied to the control medium produce a fine raster by deformation of its surface. The light traversing the medium and impinging upon the concave mirror is reflected back towards the bar system 3. The concave mirror and the bar system must be so mounted that the center of the bar system 3 approximately coincides with the focus of the concave mirror 8. Consequently the image of the bar system produced by the mirror will coincide with the bar system itself. As pointed out in the U. S. patent application of Max Hetzel, Fred August Mast and Hugo Ernst Wilhelm Thiemann, Serial No. 79,864, filed March 5, 1949, Schlieren optics is thus obtained in which one and the same bar system is traversed twice by the light flux, but which acts in the same way as the system of Schlieren optics described in the U. S. Patent No. 2,391,450.

Preferably the concave mirror is given a spherical surface and, as is well known, the desired imaging of the bar system upon itself will occur if the center of the bar system is located approximately at the center of curvature of the spherical mirror. In the following reference will be made to the employment of a spherical mirror, but all conclusion will be equally valid for any kind of concave mirror, as long as the bar system lies approximately at the focus of the concave mirror. The use of a non-spherical concave mirror may serve, for example, to correct certain inaccuracies in the image formation at such zones which are located at a certain distance from its center of curvature.

In the embodiment shown by Fig. 1 a deflection mirror 7 is disposed between the bar system and the spherical mirror. The mirror 7 forms a virtual image 14 of the mirror bar system at the emplacement of the center of curvature 15 of the spherical mirror 8. Thereby the above mentioned condition that the center of curvature of the spherical mirror must coincide with the center of the Schlieren optics is fulfilled, as this condition is also satisfied by merely forming a virtual image of the one point at the other. To be able to illustrate this in the drawing in spite of the considerable size of the radius of curvature 16 of the spherical mirror, its center of curvature is shown considerably closer to the mirror, as indicated by interruption of the rays and by bracket 17.

As has been explained in the above-mentioned U. S. patent application No. 79,864, now Patent No. 2,644,938 the light control is effected by a Schlieren optics of the kind shown by the fact that the light coming from the arc lamp 1—after reflection by the reflecting surfaces of the bars and by mirror 7—traverses the control layer and is reflected by the surface of spherical mirror 8. If the surface of the control medium is smooth, that is, when a black picture is being projected, the control layer does not influence the traversing light. The light impinges again upon the bar system and is thrown back by the reflecting surface to the crater of the arc. If, however, the surface of the control layer is deformed, light in proportion to the amount of such deformation will pass the slits of the reflecting bars and impinge upon the projection lens 18 which on the screen 19 projects an image of the part of the control medium limited by the rectangle 10. It must be mentioned that the spherical mirror 8 is kept slowly rotating in order to cool the control layer and continually reestablish its flat surface. A rake 20 is provided to maintain the correct thickness of the control medium on the spherical mirror. The devices for the rotation and cooling of the spherical mirror are not shown in the drawing, since they have been described in detail in the above-mentioned patents. Likewise is omitted the vacuum container enclosing the mirror bar system, the spherical mirror and the cathode-ray tube in order to simplify the drawing.

In order to utilize such a Schlieren optics for projection of the three colour component pictures of colour television according to the additive principle, the pictures must be superimposed on the screen in registration as is well known. For this purpose according to the invention a colour splitter 6 is inserted in the light path between the mirror bar system 3 and the concave mirror 8. This colour splitter is composed by at least two colour selective dichroic light filters having different spectral band reflection-transmission characteristics and splits the flux of white light into partial beams of e. g. red, blue and green colour. The colour splitter of the embodiment shown, e. g. consists of two intersecting reflecting planes 21 and 22, which by a suitable choice of appertaining spectral reflexion transmission characteristics permit certain parts of the spectrum to pass undisturbed whereas the residual parts are reflected. Such dichroic light filters are not new. Generally they comprise one or more layers of a dielectric medium with different indices of refraction which are deposited one above the other on a transparent support, for example, on a plate of glass, the layer thickness having to be in a definite ratio to the wavelength range of the parts of the light spectrum to be transmitted and reflected.

Such dichroic light filters (selective interference mirrors) have the advantage over the habitual absorption filters previously employed of being able to split the utilisable flux of white light generated by the light source into partial beams of different colour practically without loss. In contradistinction thereto an absorption filter which transmits a desired range of the spectrum of the white light, absorbs the residual parts of the incident white light inside the filter. This implies a considerable loss of light and a considerable thermal stress of the filter.

The two filter surfaces 21 and 22 may be so designed, for example, that the filter 21 passes the red and green portions and reflects the blue portion of the white light produced by the lamp 1, while the filter 22 will reflect red, but pass green and blue. Naturally also a different choice of filter characteristics is possible. As can be seen from Figs. 1 and 2 the white light impinges upon the colour splitter in the direction of the arrow 23. Due to the effect of the two filters 21 and 22 only blue light will issue from the splitter in the direction of the arrow 24, only green light in the direction of the arrow 25, and only red light in the direction of the arrow 26. These three partial beams of different colour now impinge upon three deflection mirrors 27, 7 and 28 and are deflected towards the spherical mirror 8 in such a way that they illuminate the rectangular areas 29, 10 and 30 by light of the respective colour, that is, blue, green and red. It is not necessary to limit the illuminating beam strictly to these rectangular areas since the light reflected by the other parts of the spherical mirror which are not scanned by the electron beam is thrown back to the crater of the light source. It is, however, possible to insert a rectangular mask of the proper size into the path of light and thus limit the illumination of the surface of the spherical mirror to the rectangular areas. Each of these three areas is assigned a cathode-ray tube 31, 11, 32 which scans the area in accordance with the picture contents of the appertaining colour component picture. It is also possible to use one single cathode-ray tube instead of three so that the scanning of the different areas is effected alternately and in succession by suitable alternate deflection of the same electron beam. After reflection by the concave mirror 8 thus traversing twice the control layer, the coloured partial light beams again pass the splitter in the reverse direction and impinge upon the mirror bar system 3. Depending upon the deformation of the individual points on the respective area they are either reflected back to the light source (dark picture points) or are thrown on the screen 19 (bright picture points) by means of the projection lens 18.

Correct cooperation of the mirror bar system and the spherical mirror is ensured for each of the component picture areas if the above-mentioned condition is fulfilled, viz. if the virtual image of the center 13 of the mirror bar system as seen from each component picture area coincides with the center of curvature 15 of the spherical mirror. This may be achieved by the proper position and inclination of the deflection mirrors 24, 7 and 28 and of the dichroic light filters 21 and 22, respectively.

Fulfillment of the above condition at the same time implies that the optical lengths of the component partial beams between the component picture areas and the bar system are equal. Consequently the pictures are superimposed in registration on the screen if they are scanned on the surface of the concave mirror in identical dimensions by the cathode-ray tubes, which is most easily effected by employment of tubes of identical design and deflection characteristics. In addition the cathode-ray tubes must be identically arranged with respect to their appertaining areas, which must be so located on the mirror that they will not appear rotated with respect to each other on the screen.

As can be seen from Fig. 2, two of the partial beams are deflected twice, i. e. once by the filters of the colour splitter, and once more by the deflection mirrors, whereas the third beam is deflected only once by deflection mirror 7, and passes straight through the colour splitter. This produces a lateral reversal of the two twice-reflected component pictures, with respect to the one reflected only once as seen from the screen. The sides of the screen 19 which are denoted in Fig. 1 by *a*, *b*, *c*, *d*, correspond to the edges of the component pictures denoted by the same letters *a*, *b*, *c* and *d* in Fig. 2. If the cathode-ray tubes are mounted as shown top and bottom of all three component pictures areas are located alike relative to the respective cathode-ray tubes. The blue and red component picture areas 29 and 30, however, have side *b* to the right and side *a* to the left as seen from the appertaining cathode ray tube, whereas for the green component picture area 10 side *a* is to the right and side *b* to the left. In order to obtain correct registration of the three colour component pictures, the area 10 has to be scanned in reverse direction by cathode-ray tube 11 with respect to component pictures 29 and 30. This is symbolized in Fig. 2 which shows the simultaneous position of the three scanning spots 33, 34, 35 on the three areas, the arrow indicating the direction of scanning of the cathode-ray.

The embodiment shown in Fig. 1 employing a colour splitter with intersecting dichroic light filters provides identical paths of light for the colour component pictures, if the splitting of the light is disregarded. This is obtained by making the line of intersection 102 of the planes of the dichroic filters 21 and 22 pass through the center of curvature 15 of the spherical mirror. This line 102 formed by the intersection of the planes of both dichroic light filters will be referred to in the following as "colour splitter axis." The planes of the three additional deflecting mirrors are inclined to the axis of the colour splitter by the same angle and intersect in a common point on that axis. The angles of deflection of light paths are of identical size, the only difference residing in the splitting up into three different spectral ranges corresponding to the component colours and the simultaneous fanning-out of the three appertaining light tubes in a horizontal plane perpendicular to the axis of the colour splitter. The mirrors 27, 7, 28 and the respective rectangular areas 29, 10 and 30 are, therefore, arranged symmetrically with respect to the colour splitter axis. In order to comply with the requirement of registration the three rectangular areas of the component pictures are so located on the surface of the spherical mirror that their centers lie on a circle 104 around the point of intersection 103 of the axis of the colour splitter with the surfacce of the spherical mirror, and that the center lines of the rectangular areas lying at right angles to the direction of scanning intersect at this same point 103.

A symmetrical arrangement of this kind with identical deflection of the partial light beams offers advantages of design. For example, identical structural adjusting elements may be used for all partial beams which greatly facilitates set up of the apparatus. The symmetrical arrangement also permits to easily foreccast and keep within reasonable limits maladjustments caused by external forces, for example, by temperature effects, or even compensate them automatically.

As will be seen such an apparatus for large screen projection has the advantage that the same Schlieren optics with only one bar system and one concave mirror may be utilized for the simultaneous projection of the colour component pictures of a coloured television picture or the like. The utilisable flux of white light reflected by the bar system is fully utilised for projection practically without any losses of light.

The deflection of the paths of light of different colour between the mirror bar system and the concave mirror furthermore permits a much more compact arrangement of bar system and concave mirror though maintaining the necessary optical path length between concave mirror and bar system. This permits a very desirable reduction in size of the vacuum container which, as mentioned before, encloses the concave mirror, cathode-ray tubes and the bar system.

Figures 8, 9:
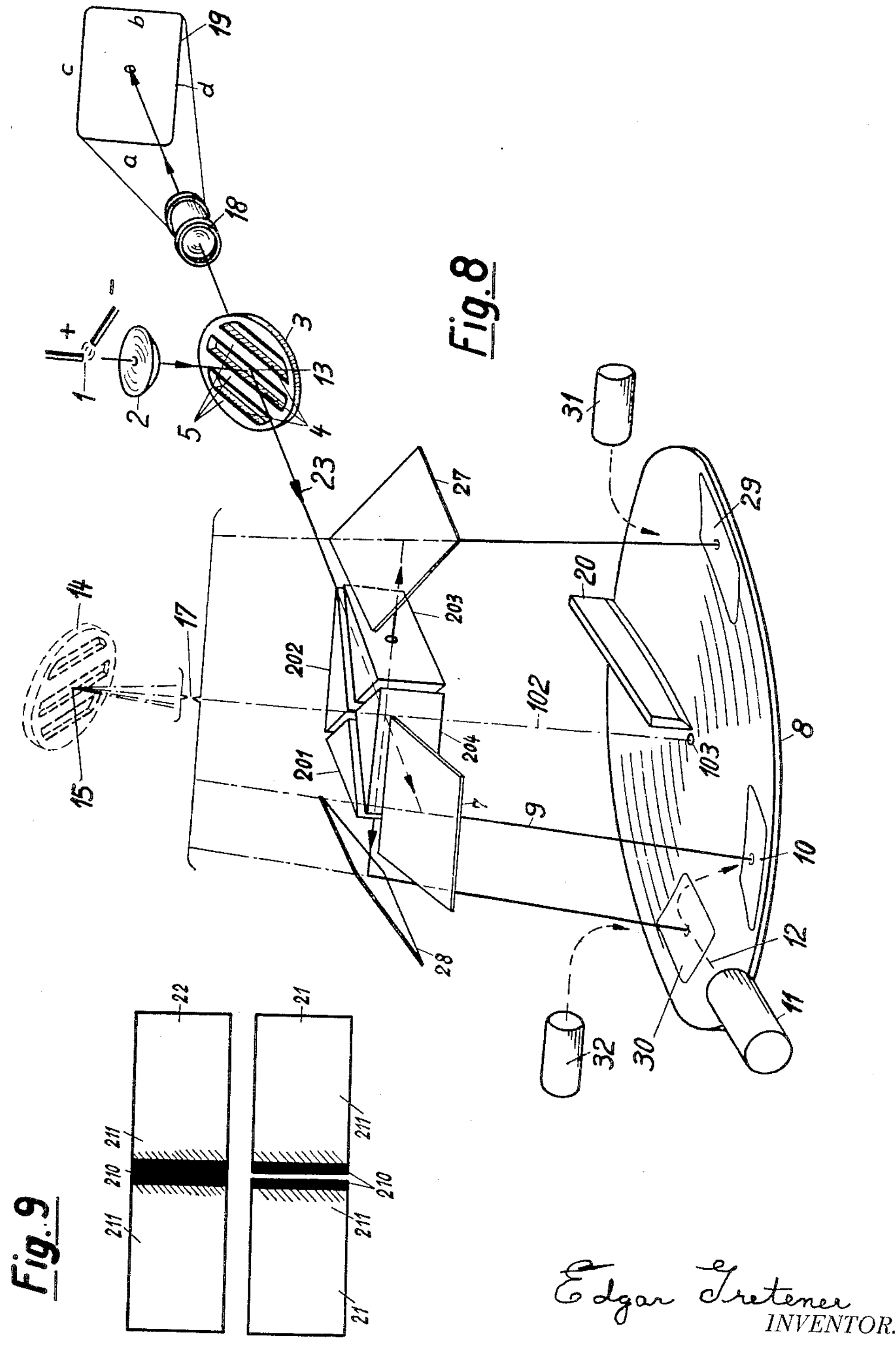
Fig. 8 is a view similar to Fig. 1 illustrating a modified construction utilizing prisms in lieu of mirrors as a colour splitter.
Fig. 9 is a modification of a detail of construction shown in Fig. 1.

A slight disadvantage of a colour splitter consisting of a set of selectively reflecting dichroic mirrors inside the Schlieren optics as shown by Fig. 1 is presented by the zone of intersection of the dichroic mirrors, which is incapable of achieving the desired light splitter effect. The selectively reflecting coating of the glass support plates of both mirrors do not intersect due to the finite thickness of the glass, but leave a blank zone on at least one of the mirrors. Furthermore the optical path length of the rays inside the glass support plates is different whether the rays traverse the colour splitter inside or outside this zone of intersection of the plates. The disturbing effect of this zone may be avoided by using a combination of four rectangular prisms instead of two intersecting mirrors. The dichroic filters, i. e. the coatings of different spectral reflexion-transmission characteristics are applied to those surfaces of the prisms, which intersect at right angles, and the prisms are then mounted in such a way that two planes of different spectral characteristics are obtained. These four prisms may either be cemented together, which, however, sets up very high requirements as to the accuracy of prisms and of cementing or the four prisms may be mounted in a common adjustable frame. An arrangement wherein such prisms are employed in lieu of intersecting mirrors is shown in Fig. 8 which apart from this feature corresponds to the embodiment of Fig. 1. Four prisms 201, 202, 203, 204 are employed in lieu of the two intersecting mirrors (21, 22 of Fig. 1). Two of the optically effective surfaces of the prisms include an angle of 90°. The four prisms are cemented together with these surfaces in the manner shown in the drawing. Selectively reflecting and transmitting layers are applied to the different surfaces of the prisms before cementing. The transmission-reflection characteristics thereof are so selected that after cementing, the surface in between prisms 201/202 and 203/204, respectively, has the same characteristic as mirror 21 of Fig. 1, and the surface in between prisms 201/204 and 202/203, respectively, has the same characteristic as mirror 22 of Fig. 1. In this prism arrangement the path length inside the glass is identical for all rays. The disturbing effects of the blank zone may, however, also be eliminated by making opaque zones of the dichroic mirrors adjacent to the line of intersection. This may, for example, be effected by blackening the mirrors by replacing the mirrors at such zones by opaque parts, or by blanking them off by use of suitably shaped masks. In order to prevent the disturbing effect produced by sharp boundary lines of such opaque zones, parts or mask further zones of limited bredth may be located between the opaque zones and the filter having a transparency increasing in the direction away from the opaque zone so that inside this limited boundary zone light absorption decreases with increasing distance from the opaque zone as shown at 106 in Fig. 1. Details of this modification are shown in Fig. 9 which shows mirrors 21 and 22 of Fig. 1 in front view. At the parts of mirror 22 adjacent to the edges of mirrors 21 the surface is given an absorbing coating 210. The boundaries of this coating 210 are not sharp but show a zone 211 of decreasing absorption and consequently increasing transmission. Thereby the shadowing effect of the absorbing zone is minimized. Similarly the mirrors 21 of Fig. 1 are provided with absorbing zones 210 with boundary zones 211 of increasing transmission and decreasing absorption.

Figures 3, 4:
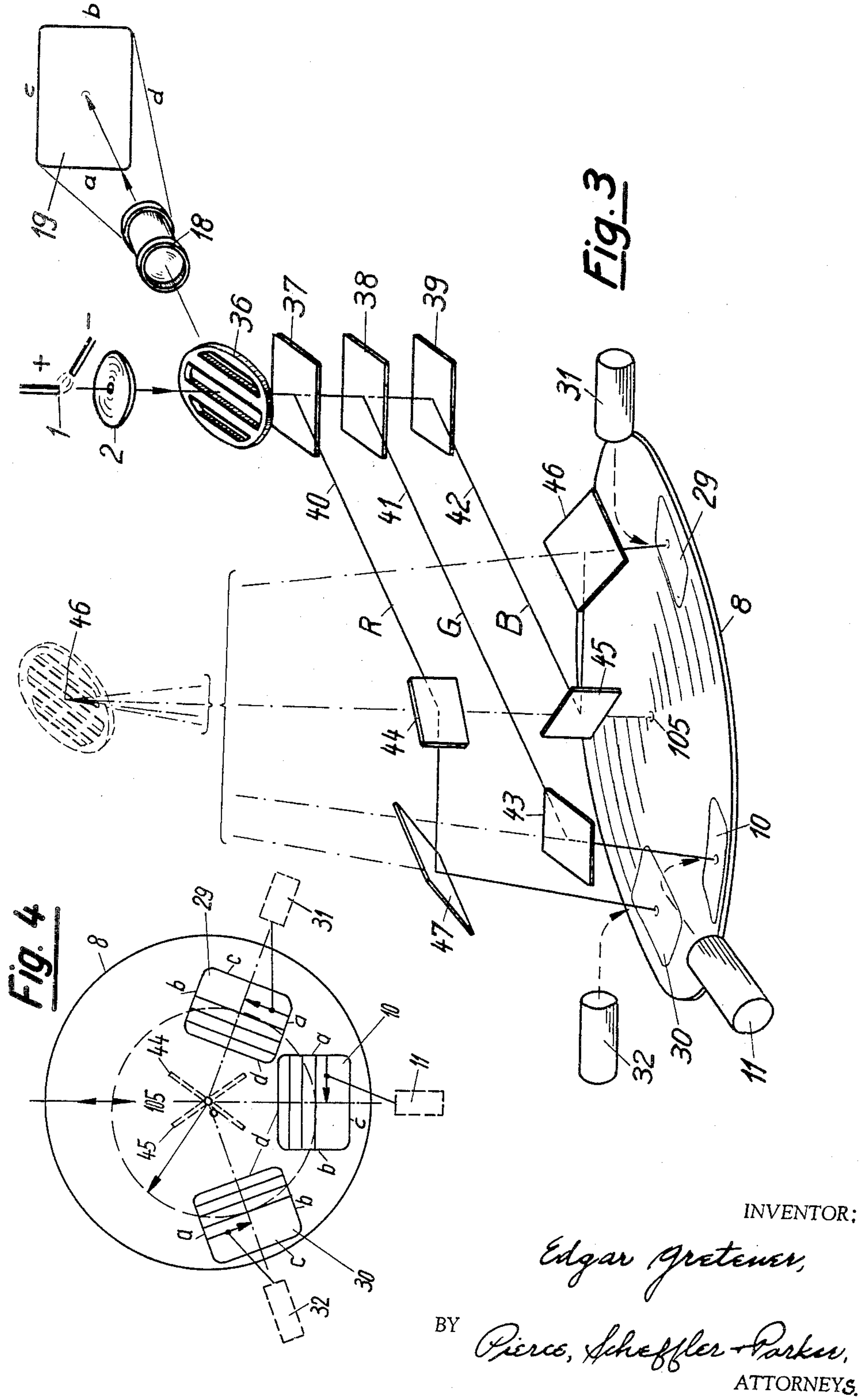
Fig. 3 shows in schematic perspective representation another embodiment of the invention similar to that of Fig. 1, with a different location of the selective dichroic mirrors.
Fig. 4 shows in top view the position of the areas of the colour component pictures on the concave mirror of an embodiment according to Fig. 3.

Fig. 3 shows another embodiment of the invention which provides a Schlieren optics similar to that shown by Fig. 1. Identical parts are given the same reference numbers as in Fig. 1. The embodiment in Fig. 3, however, uses a colour splitter consisting of parallel colour selective dichroic mirrors and thereby avoids the disadvantage caused by the zone of intersection next to the axis of the colour splitter. The arrangement again provides a light source 1 to illuminate a bar system 36 through a condenser lens 2 and the light flux issuing from the Schlieren optics after reflection by concave mirror 8 is projected onto a screen 19 by the lens 18. The concave mirror 8 is again covered with a layer of the control medium on which three rectangular areas 29, 10 and 30 corresponding to the three colour components are scanned by three cathode-ray tubes 31, 11 and 32. In contradistinction to the arrangement in Fig. 1, the reflecting coating of the bar system 36 is located on the lower instead of the upper surface of the bars. The light passes through the slits in the bar system 36 and impinges in succession upon two colour selective dichroic mirrors 37 and 38 and an additional non-selective plane mirror 39. According to the representation the mirrors are approximately parallel. The transmission reflexion characteristics of the dichroic light filters are chosen so that, for example, mirror 37 reflects red, while passing blue and green, and the mirror 38 reflects red and green while passing only blue. Thus the whitelight flux is subdivided into three parallel beams 40 (red), 41 (green) and 42 (blue) of different colour and located one above the other. The light beam 41 directly impinges on mirror 43 and is deflected towards the concave mirror 8 in such a way that it illuminates the rectangular area 10 which belongs to the green component picture and is scanned by the cathode-ray tube 11. The two mirrors 44 and 45 are mounted in the light paths 40 and 42, the mirrors having reflecting surfaces in vertical planes which, if extended, would intersect along a line passing through the center of curvature 46 of the concave mirror and intersecting the mirror surface at point 105. Mirrors 44 and 45 deflect the two light beams 40 and 42 to lie in horizontal planes which are perpendicular to the plane defined by the optical axis 49 of the projection lens and the center of curvature of the concave mirror. Two additional deflection mirrors 46 and 47 deflect the two light beams so as to illuminate the two corresponding rectangular areas 29 and 30. After deflection on the concave mirror the reflected light traverses the colour splitter in the reverse direction. Depending upon the deformation of the surface, it either passes back through the slits of the bar system (dark picture points) or is so deflected by the deformation of the surface that it impinges upon the reflecting bottom surface of the bars and is thrown on the screen 19 by the lens 18 (bright picture points).

The additional deflecting mirrors 46, 43 and 47 are again so arranged that a virtual image of the center of the bar system 36 as seen from the component picture areas is formed at the center of curvature of 46, so the above-mentioned condition for the correct functioning of the Schlieren optical device is again satisfied.

In contradistinction to the arrangement of Fig. 1, which provides light paths of identical shape and a symmetrical position of the picture areas on the concave mirror, the component picture areas of Fig. 3 are not arranged symmetrically on the surface of the spherical mirrors. The above mentioned center lines of the rectangular areas, which are at right angles to the direction of scanning, intersect at point 105 but the centers of the picture areas are disposed at different distances from this point. This is necessary in order to realize an optical length of the partial beams which will locate the virtual images of the bar system at the center of curvature of the concave mirror. Furthermore, the planes of the three mirrors 43, 46 and 47 no longer meet at a common point.

As regards orientation of the picture areas, one thereof, namely the green component picture area 10, is again laterally reversed with respect to the two other component pictures. This area has again to be scanned by the respective cathode-ray tube in the reverse direction with respect to the other two component pictures. This is shown by Fig. 4, which otherwise is similar to Fig. 2.

A closer examination shows that even the three reflecting planes of the colour splitter need not be parallel. To warrant satisfactory functioning only the Schlieren optics condition and the condition of exact superposition in registration of the three component pictures have to be satisfied. That is, a virtual image of the center of the bar system must appear at the center of curvature of the concave mirror as seen from each of the three component picture areas and the component pictures must be so inscribed on the surface of the concave mirror that they will coincide on the screen in registration.

The use of colour selective dichroic mirrors forcibly ensures a uniform white illumination of the screen. In the additive colour method, as is well known, white parts of the picture are obtained by the superposition of three coloured lights. Homogeneous white illumination is most easily obtained and least subject to disturbances if the different colour beams which illuminate the individual colour component pictures are as identical as possible as regards distribution of intensity, and if the means employed to effect the superposition are as identical as possible. This is actually the case in the shown embodiments of the invention according to which the three coloured light beams corresponding to the three fundamental colours are derived from a beam of white light by means of the colour selective dichroic mirrors, the light paths of the component beams being geometrically and optically identical, and are superimposed again in the same way, the optical identity of the three component beams being already required to satisfy the condition of the Schlieren optic.

The embodiment shown in Fig. 3 providing a set of parallel mirrors has no prisms or lenses located in the light path between the bar system and the concave mirror. This is a fact highly important in a Schlieren optics and eliminates to a high degree the formation of stray light, which would otherwise considerably reduce the contrast of projection, and make impossible projection of pictures with a great range of brilliancy contrasts.

Figures 5, 6:
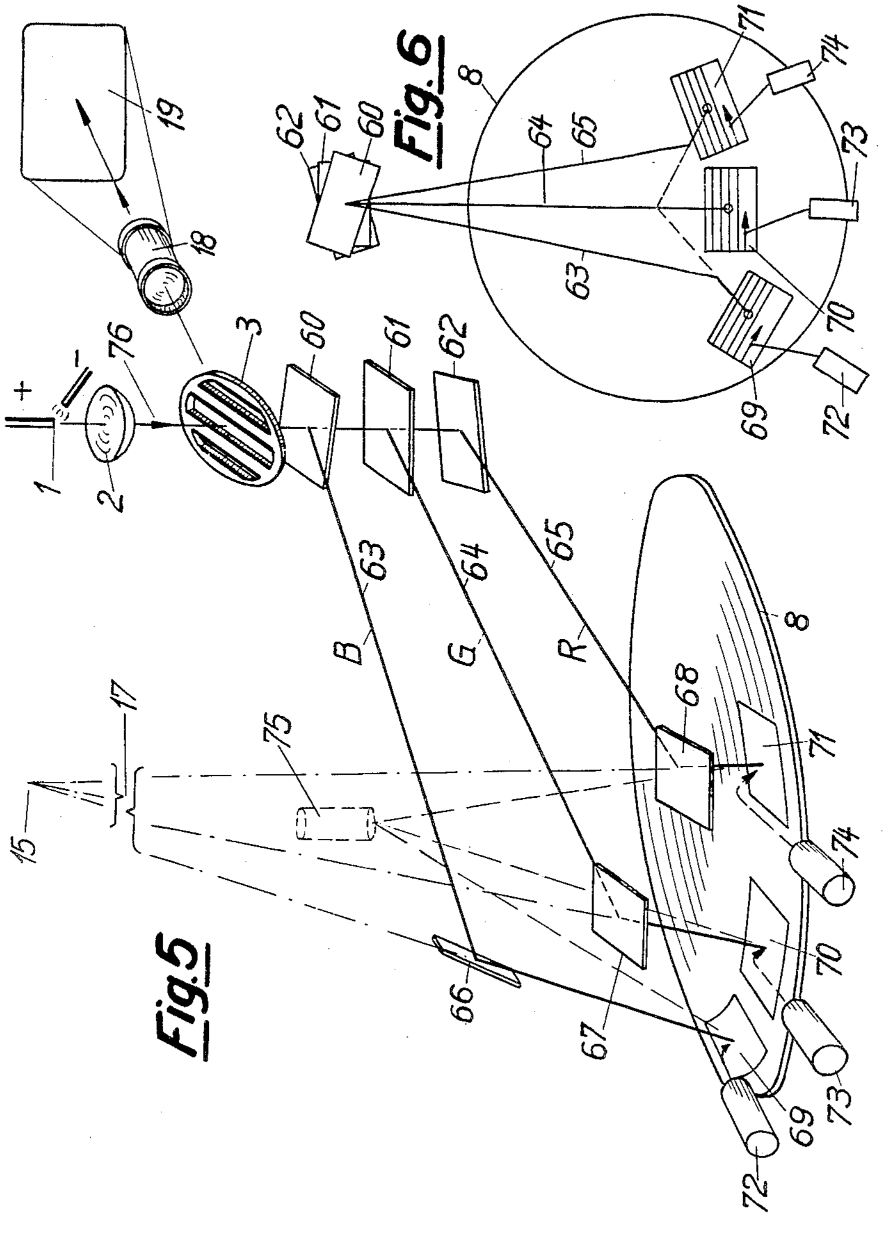
Fig. 5 shows in schematic perspective representation another embodiment which requires a minimum of deflection mirrors.
Fig. 6 shows the corresponding position of the colour component pictures on the surface of the concave mirror.

An embodiment wherein the surfaces of the colour splitter are not parallel is shown in Fig. 5, the same notation as in Figs. 1 and 3 being used for identical parts. Similarly to Fig. 3, the light flux emanating from the light source passes through the slits of the bar system 3 and impinges in succession upon two colour selective dichroic mirrors 60 and 61, and an additional deflecting mirror 62. The three mirrors are so arranged that the rays reflected by them, as observed from above, fan out laterally. Although according to the drawing they still lie in parallel planes, the following considerations will apply also to the more general case where the three beams do not lie in parallel planes. The transmission-reflexion characteristics of the dichroic mirrors may, for example, be so chosen that mirror 60 reflects blue and transmits red and green, while mirror 61 reflects green and transmits red. The partial light beam 63 consequently is blue, the partial beam 64 is green and the partial beam 65 is red. The three partial beams are then deflected towards the concave mirror by three additional deflecting mirrors 66, 67, 68. The position and inclination of such mirrors is so chosen that the virtual image of the center of the bar system is located at the center of curvature of the spherical mirror as seen from the picture areas 69, 70, 71 illuminated by the partial light beams the Schlieren optics condition being thus again satisfied. In order to insure correct superposition of the colour component pictures on the screen, the rectangular areas scanned by the three cathode-ray tubes 72, 73 and 74 must be properly located on the surface of the concave mirror. The rectangular areas may, for example, also be scanned in succession by a common cathode-ray tube 75, which is indicated in dotted lines.

In contradistinction to Figs. 1 and 3 the embodiments of Fig. 5 shows no symmetry of position of the coloured component picture areas on the surface of the concave mirror, but requires a minimum number of deflecting mirrors. The advantage of a smaller number of component parts is thus counteracted by the problem of scanning areas of identical size with the three cathode-ray tubes in spite of the lack of symmetry. A special case of this embodiment is obtained when the surface of the concave mirror and optical axis of the mirror bars of the Schlieren system 76, respectively, are so arranged that the center of curvature of the spherical mirror lies on the axis 76. In this case the component picture areas are arranged on the surface of the spherical mirror symmetrically with respect to the point of intersection of the optical axis 76 with the mirror surface.

Figure 7:
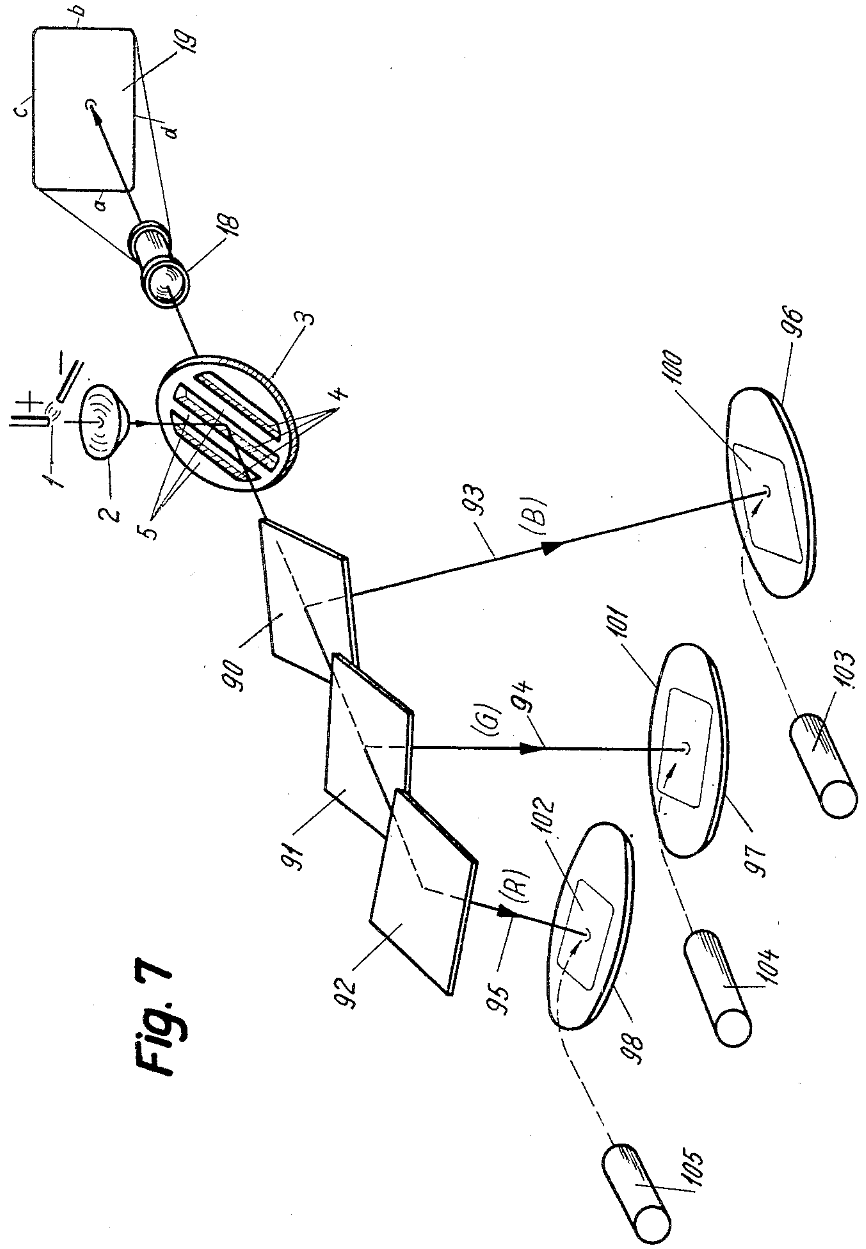
Fig. 7 shows in schematic perspective representation a further embodiment of the invention which in place of a single concave mirror employs a plurality of concave mirrors co-operating with one common mirror bar system.

In contradistinction to the above described arrangements the embodiment shown by Fig. 7 employs in place of one common concave mirror a plurality of separate concave mirrors which all co-operate with a common mirror bar system. Fig. 7 shows such an embodiment in schematic perspective representation all parts corresponding to parts of the embodiment of Fig. 1 being given identical reference numbers. The light flux emanating from a light source 1 traverses a condensor lens 2 and impinges upon a mirror bar system 3, the bars 4 of which have a reflecting surface 5. The light reflected by this reflecting surface of the bars enters a colour splitter which, by ways of example, comprises two colour-selective dichroic mirrors 90 and 91 and a customary deflection mirror 92. Thereby the impinging white light is split up into geometrically separated partial beams of different colour. The transmittance-reflectance characteristics of the dichroic mirrors may be chosen e. g. in such a way that the dichroic mirror 90 reflects blue light and passes red and green light, whereas the dichroic mirror 91 reflects green light and passes red light. Thus three light beams are formed the direction of which is indicated by arrows 93, 94 and 95 comporting the blue, green and red portion of the white light, respectively. Underneath the colour splitter three concave mirrors 96, 97, 98 are located and the reflecting surface of each is covered with a light control layer as described above. Three areas 100, 101 and 102 are scanned on this control layer by means of cathode ray tubes 103, 104 and 105 in correspondence with the blue, green and red component picture signals, respectively. The relative position of the mirror bar system of the different mirrors of the colour splitter and of the concave mirrors is now chosen in such a manner that in each of the three light paths of different colour a virtual image of the center of curvature of the appertaining concave mirror is formed at the center of the mirror bar system. Thereby the reflecting surfaces of the separate concave mirror co-operate with the mirror bar system in the same way as the different surface portions of the common concave mirror assigned to the individual component pictures in the embodiments of Figs. 1, 3 and 5.

By each of the separate concave mirrors an image of the mirror bar system is projected upon the bar system itself and according to momentary state of the control layer at the various points of the component pictures the light reflected by the concave mirrors is either thrown back upon the light source (dark picture points) or passes through the slits of the mirror bar system and is projected upon the screen 19 by the projection lens 18 (bright picture points).

Besides the "Schlieren optics condition" the second above mentioned condition must be fulfilled for all component light paths, i. e. the picture areas must be seen to coincide in registration from the bar system. To comply with this requirement the component areas 100, 101, 102 must be scanned by the three cathode ray tubes 103, 104 and 105 in identical size, and such areas must be disposed on the surface of the concave mirror in correct orientation so as to be projected upon the screen in registration. If these two conditions are fulfilled the embodiment of Fig. 7 will act in the same manner as if the component picture areas were located on the surface of one common concave mirror as that was the case with the embodiments shown by Figs. 1, 3 and 5. From the point of view of an observer located at the mirror bar system or at the projection screen it is irrelevant how the component light paths are deflected between the mirror bar system and the control layer or if the component picture areas are located on a common or on several individual concave mirrors, provided the "Schlieren optics" and the "registration" conditions are fulfilled for each component light path.

The embodiment shown by Fig. 7 represents the general case of the invention which permits to utilize one common mirror bar system for the simultaneous projection of component pictures, whereas the arrangements providing one concave mirror common to all component pictures represent specific cases thereof. The specific cases are obtained from the general case if the centers of curvature of the separate mirrors which of necessity must provide equal radii of curvature in order to comply with the above mentioned conditions, are made to coincide in reality and the surfaces of the separate mirrors are united to form one single concave mirror.

The employment of a plurality of separate concave mirrors entails a somewhat more complicated construction, whereas employment of a plurality of separate mirrors provides one additional degree of freedom of construction which permits fulfillment of the above mentioned conditions with reduced difficulties. Particularly the number of required deflection mirrors is reduced and adjustment thereof is simplified. Furthermore it is possible to interlace concave mirrors and cathode ray tubes as indicated in Fig. 7 whereby the required space is minimized.

Reference has been made in the foregoing to the employment of the described apparatus for the projection of television pictures, and it is to be understood that the term "television picture" is employed in a broad sense to identify any kind of picture synthesized by trains of electrical signals which are obtained by scanning an original picture or a scene along contiguous lines.

I claim:

1. An apparatus for projecting at the same time all colour component pictures of a colour television picture or the like, said apparatus including, a white light source with illumination system, a single mirror bar system, concave mirror means having thereon a control layer providing an individual picture area for each component picture, a projection lens, cathode ray means scanning said picture areas to impart thereto point-to-point variations in the control layer in correspondence with the appertaining picture signals, and optical means including a plurality of dichroic light filters of different reflection-transmission characteristics located between said single mirror bar system and said picture areas of said concave mirror means for directing upon the respective picture areas differently colored beams split from the white light emitted by said light source; said optical means for each picture area developing a virtual image of said mirror-bar system with its center substantially coinciding with the center of curvature of the associated picture area, whereby one and the same mirror-bar system is utilized for all color component pictures.

2. An apparatus as claimed in claim 1, wherein said concave mirror means comprises a single concave mirror upon which the several picture areas are located.

3. An apparatus as claimed in claim 2, wherein a separate cathode ray source is provided for each colour component picture, said sources being of identical structure, identical deflection characteristics and being identically arranged with respect to the appertaining colour picture area.

4. An apparatus as claimed in claim 2, wherein the center lines of said component picture areas directed at right angles to the direction of scanning intersect in a common point.

5. An apparatus as claimed in claim 4, wherein the dichroic light filters of said optical means are arranged to form two intersecting planes of different spectral reflection-transmission characteristics, and wherein the line of intersection of said planes extends at right angles to the optical axis of the projection lens and passes through the center of curvature of said concave mirror.

6. An apparatus as claimed in claim 2, wherein the cathode ray means comprises a separate cathode ray source for each picture area, the dichroic filters include two filters positioned in the path of the white light from the mirror bar system to deflect two beams of different colors laterally and to pass a beam of a third color without deflection, and the picture area which is illuminated by the light beam passing undeflected through said dichroic filters, is scanned by the appertaining cathode ray in reverse direction with respect to the direction of scanning of the other two areas.

7. An apparatus as claimed in claim 5, wherein the colour splitter is composed of four rectangular prisms, said dichroic light filter layers being applied to the surfaces of said prisms and such prisms being mounted in such a way that two intersecting planes of different reflexion-transmission characteristics are obtained.

8. An apparatus as claimed in claim 2, wherein said dichroic filters are arranged to provide two intersecting planes of different reflection-transmission characteristics, and on each of said dichroic light filters zones adjacent to said line of intersection are made opaque and wherein further zones of limited breadth are located adjacent to said opaque zones having a transparency increasing in the direction away from the opaque zone whereby disturbances of projection caused by the zone on intersection of said mirrors are eliminated.

9. An apparatus as claimed in claim 2, wherein the dichroic light filters are arranged in such a way that the line of intersection of their respective planes is located outside the utilized tube of light between the mirror-bar system and the concave mirror and where said planes are at right angles to a plane defined by the axis of the projection lens and the center of curvature of said concave mirror.

10. An apparatus as claimed in claim 2, wherein the dichroic light filters are arranged in such a way, that the line of intersection of their respective planes is located outside the utilized tube of light between said mirror-bar system and said concave mirror, and wherein the optical axis of the mirror-bar system passes through the center of curvature of said concave mirror.

11. An apparatus as claimed in claim 1, wherein said concave mirror means comprises a separate concave mirror for each component picture area.

References Cited in the file of this patent

UNITED STATES PATENTS

| | | |
|---|---|---|
| 2,330,172 | Rosenthal | Sept. 21, 1943 |
| 2,465,652 | Legler | Mar. 29, 1949 |
| 2,549,585 | Epstein | Apr. 17, 1951 |
| 2,568,543 | Goldsmith | Sept. 18, 1951 |
| 2,577,756 | Harrington | Dec. 11, 1951 |
| 2,589,930 | Dimmick et al. | Mar. 18, 1952 |
| 2,600,590 | Thomas | June 17, 1952 |

FOREIGN PATENTS

| | | |
|---|---|---|
| 268,713 | Switzerland | May 31, 1950 |